United States Patent [19]

Kamphues

[11] 4,336,874

[45] Jun. 29, 1982

[54] SETTING MACHINE FOR SPACING FORMED ARTICLES

[75] Inventor: Hermann Kamphues, Ibbenbueren, Fed. Rep. of Germany

[73] Assignee: C. Keller GmbH & Co., KG, Maschinenfabrik, Ibbenbüren-Laggenbeck, Fed. Rep. of Germany

[21] Appl. No.: 145,446

[22] Filed: May 1, 1980

[30] Foreign Application Priority Data

Sep. 22, 1979 [DE] Fed. Rep. of Germany ....... 2938403

[51] Int. Cl.[3] .............................................. B65G 47/26

[52] U.S. Cl. ....................................... 198/458; 414/60

[58] Field of Search ............... 198/456, 458, 434, 425, 198/485; 414/50, 51, 53, 749-751, 60, 61

[56] References Cited

U.S. PATENT DOCUMENTS

| | | | |
|---|---|---|---|
| 3,247,981 | 4/1966 | Johnson | 198/418 X |
| 3,736,997 | 6/1973 | Bottorf | 198/774 X |
| 3,737,019 | 6/1973 | Coleman et al. | 198/458 X |
| 4,119,217 | 10/1978 | Jones | 198/458 X |
| 4,177,890 | 12/1979 | Steingrover | 198/458 X |

*Primary Examiner*—Robert B. Reeves
*Assistant Examiner*—Douglas D. Watts
*Attorney, Agent, or Firm*—Horst M. Kasper

[57] ABSTRACT

In a setting machine for spacing formed articles a conveyor belt provides closely spaced green bricks in longitudinal rows. The longitudinal rows are transferred to a setting support collecting the green bricks as a compact setting or a partial setting of several parallel longitudinal rows or of one longitudinal row. The setting support comprises spaced rollers and carrying strips between the rollers and capable of moving in the direction of the roller axes. Each carrying strip is subdivided into spaced apart sections which are linked to lift cylinders moving them up and down independently. The lift cylinders are mounted on a carriage movable in the direction of the roller axes and which carries along the sections. The sections can lift up the green bricks from the rollers, the carriage can then move and after sufficient distance is reached the green bricks are lowered onto the rollers. The thus provided setting can be removed onto a conveyor or can be lifted by grippers.

13 Claims, 4 Drawing Figures

SETTING MACHINE FOR SPACING FORMED ARTICLES

BACKGROUND OF THE INVENTION

1. Field of the Invention

This invention relates to an apparatus and a method for setting formed articles in a desired spacial order.

2. Brief Description of the Background of the Invention

Including Prior Art

Kamphues in U.S. Pat. No. 3,887,060 discloses apparatus and methods for forming rows of selectively spaced articles. An array of formed bricks is made up of longitudinal rows and cross rows and this array of bricks is lifted up from rollers by carrying strips and moved in the direction of the roller axes until the front cross row in the direction of movement encounters an impedance which pushes the last cross row from the carrying strips back onto the rollers. The remaining lifted up cross rows are upon lifting of the impedance moved on until reaching a desired cross row distance. A new impedance then effects that another cross row of bricks is pushed from the carrying strips onto the rollers. Such a pushing of cross row after cross row of bricks from the carrying strips onto the rollers results in cross rows having certain defined distances from each other. The total path of the carrying strips corresponds to the total space taken up by the brick array after separating the cross rows.

It is a disadvantage of this apparatus that the green bricks during the formation of the spaced array are moved from a higher level, the carrying strips, to a lower level, the rollers by tipping. This tipping results in an inaccurate transfer of the green bricks, since the green bricks are thereby deformed based on their larger or smaller attachment to the higher level and the distances between the individual cross rows become inaccurate. This is in particular the case, when the arrays are formed by green bricks of low cutting width. It is then possible that the green bricks fall out of the gripper during transporting them, since they had not been sufficiently caught by the gripper. In the conventional apparatus the level receiving the green bricks and during array reformation higher lying level of carrying strips covers a path which corresponds to the total width of the array. Only then the carrying strip level can be lowered below the level of the rollers and be brought back to its starting position to start the formation of a new array. These steps of motion take a lot of time and are therefor a negative factor on the output.

SUMMARY OF THE INVENTION

1. Purposes of the Invention

It is an object of the invention to provide a setting apparatus and method which avoids tipping of the formed articles.

It is another object of the invention to provide a setting apparatus and method providing an accellerated way of setting the formed articles.

It is a further object of the invention to provide a setting apparatus and method which allows accurate positioning in the placement of the formed articles.

These and other objects and advantages will become evident from the description which follows.

2. Brief Description of the Invention

The present invention provides an apparatus for setting formed articles which comprises means for providing the formed articles, a series of horizontally spaced rollers for receiving the formed articles from the means providing the formed articles and the axes of the rollers are substantially normal to the direction of motion of the articles being received. At least two independently operable lift cylinders are mounted on a carriage movable in a direction substantially parallel to the axes of the spaced apart rollers. The lift cylinders are connected to at least two support strips which are subdivided into sections. The support strips extend in a direction substantially parallel to the roller axes and the sections are capable of moving up and down between the rollers. Means is provided for removing the formed articles such as a gripper or a conveyor belt. The sections of the carrying strips for the formed articles can be connected by linkages and the lift cylinders can actuate the linkages. Preferably each carrying strip is supported by at least two lift cylinders.

The present invention also provides a method for setting formed articles on top of a series of parallel rollers. Support sections move through the spaces between the rollers and form at least one strip normal to the axes of the rollers. At least some of the formed articles are lifted from the rollers by some support sections and they are moved together in a direction parallel to the roller axes. The support sections and the formed articles are then lowered and placed down and the formed articles are then removed. The formed articles can be restrained from tipping by a bar positioned slightly above their top. The formed articles can be removed by gripping them from above or by lifting them up from below and carrying them away from the parallel rollers. The apparatus and method avoid tipping of the formed articles and provide an accelerated setting method. The formed articles are lowered vertically by the carrying sections onto the rollers without any tipping motion and the distances to be provided between the formed articles can be maintained accurately. The apparatus of the present invention further provides that the sections of the carrying strips during the formation of the new array are only moved over a path which corresponds to the sum of the individual spaces to be provided between the rows of formed articles. After the required spaces are provided between the rows the row can be moved to a collector conveyor and there they can be gripped by a gripper and lifted up. The carrying strips are moved immediately into starting position when all sections have been lowered under the roller level. The shorter path of the carrying strips during the formation of the new array results in a shorter length of the apparatus which reduces the capital requirements. The apparatus of the present invention allows to space all forms of articles and in particular forms of bricks and blocks, since the length of the sections corresponds to the shortest thickness desired for the formed articles. At the shortest thickness of the formed article one section supports one article and wider articles can be supported by more than one section. The restraining bars prevent a possible tipping of the formed articles.

The invention accordingly consists in the features of construction and series of steps which will be exemplified in the apparatus and method hereinafter described and of which the scope of application will be indicated in the appended claims.

BRIEF DESCRIPTION OF THE DRAWINGS

In the accompanying drawing in which is shown one of the various possible embodiments of the invention.

DETAILED DESCRIPTION OF THE PREFERRED EMBODIMENTS

Figure 1:
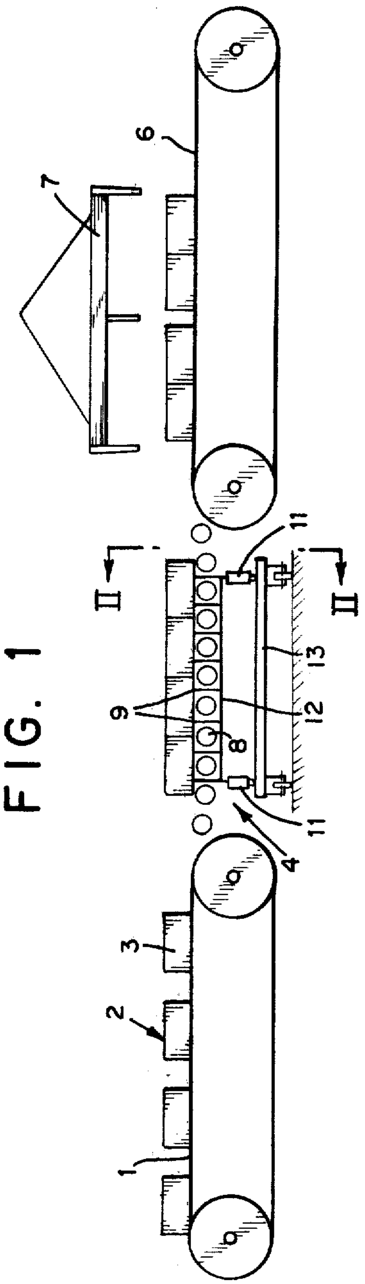
FIG. 1 is a side elevational view of the apparatus.
Figure 2:
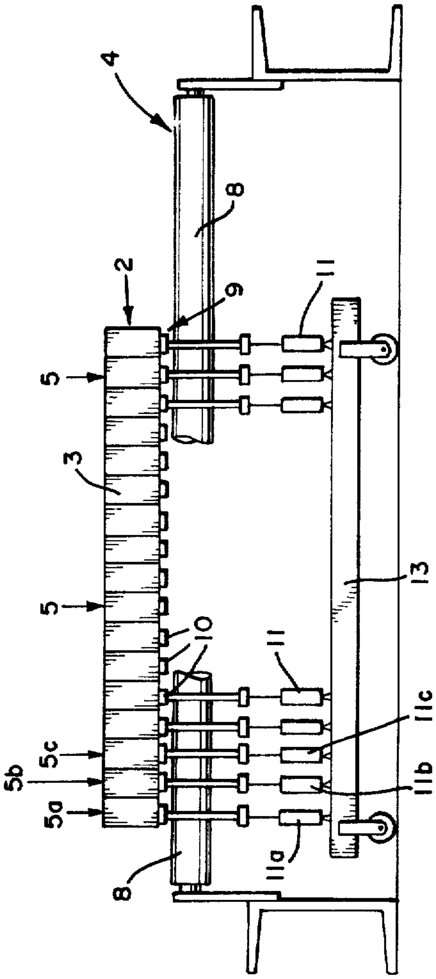
FIG. 2 is a view in the direction of line II—II of FIG. 1.

Referring now to FIG. 1, there is shown a conveyor belt 1 carrying closely spaced formed bricks 3 in longitudinal rows 2 to a setting support 4. The setting support can be capable of accepting a full or a partial setting. The setting can comprise for example four longitudinal rows 2 and a partial setting can comprise only a single longitudinal row 2. After suitable distances have been provided between the cross rows 5 the setting is transferred to a collector belt 6 and lifted by a grouping gripper 7. A partial setting is similarly after providing the required spacings between the formed articles carried to the collector belt 6, where by composition of several partial settings a setting is put together, which is then lifted by the grouping gripper from the collector belt.

The setting support 4 comprises parallel spaced rollers 8 and carrying strips 9 disposed between the rollers 8. Each carrying strip 9 is subdivided into sections 10, which are spaced apart. Each section 10 is connected to a lift cylinder which can move the section 10 up and down.

When several carrying strips are placed in parallel for receiving a setting of formed articles, then the sections 10 supporting a cross row are connected to each other by a linkage 12. Two lift cylinders 11 mounted to the linkage 12 move the linkage 12 and thereby the sections 10 up and down.

The lift cylinders 11 are mounted to a carriage 13 which can move in the direction of the longitudinal axes of the rollers 8 and which carries the sections 10 along. When larger formed articles 3*a* are handled then horizontal restraining bars 14 are provided above of the carrying strips 9 and extending over the sections 10 for preventing the formed articles 3*a* from tipping over.

When a new setting or partial setting is to be placed on the setting support 4, then all sections 10 are lifted up by the lift cylinders 11 and thereby begin supporting the formed articles 3 from below and lift them up from the rollers 8.

By actuating the lift cylinders 11*a* downward, the formed articles 3 positioned in cross row 5*a* are placed again on the rollers 8 and the sections 10 which carried the cross row 5*a* move into the non operating position below the level of the rollers 8. Then the carriage 13 is moved in the right hand direction for providing a distance between the cross row 5*a* placed on the rollers 8 and the cross row 5*b* remaining in the lifted up situation. When the desired spacing is reached the lift cylinders 11*b* and with them the sections 10 carrying the cross row 5*b* are moved downward and place the cross row 5*b* onto the rollers 8. The carriage 13 continues to move in the direction of the arrow A and provides the desired spacing between the cross row 5*b* and the cross row 5*c*. When the desired spacing is reached the lift cylinders 11*c* are lowered and the cross row 5*c* is placed onto the rollers 8. This way the desired distances or spacings between all cross rows 5 are provided and in each case the corresponding lift cylinders 11 actuate the corresponding sections 10.

Figure 3:
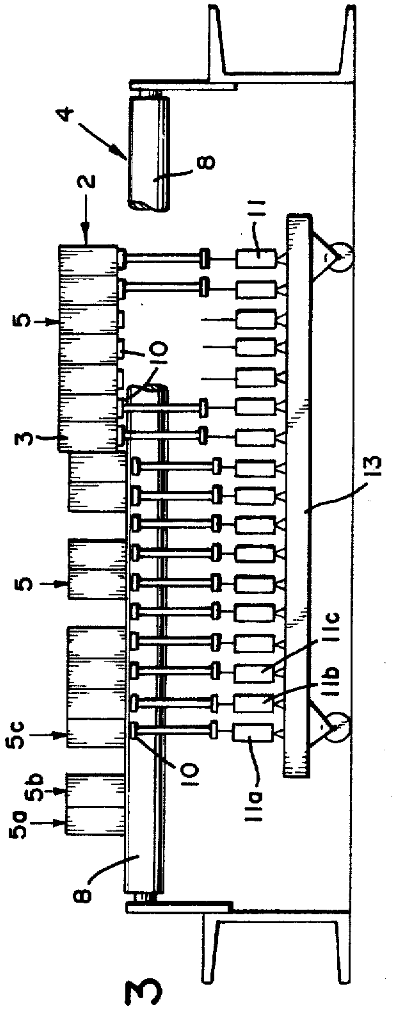
FIG. 3 is a view similar to the view of FIG. 2, however in a different phase of operation.

It is also possible to actuate several lift cylinders 11 coordinated to a carrying strip at the same time, for example when it is desired to place the cross rows 5*a* and 5*b* without spacing onto the rollers 8 (FIG. 3). The lift cylinders 11*a* and 11*b* are then operated simultaneously. The operation of the lift cylinders can be performed depending on the program of the individual setting or partial settings, respectively. The carriage 13 can be moved continuously into the right hand direction during the placing of the setting onto the rollers or the carriage can be shortly stopped for placing a cross row 5 onto the rollers 8.

Figure 4:
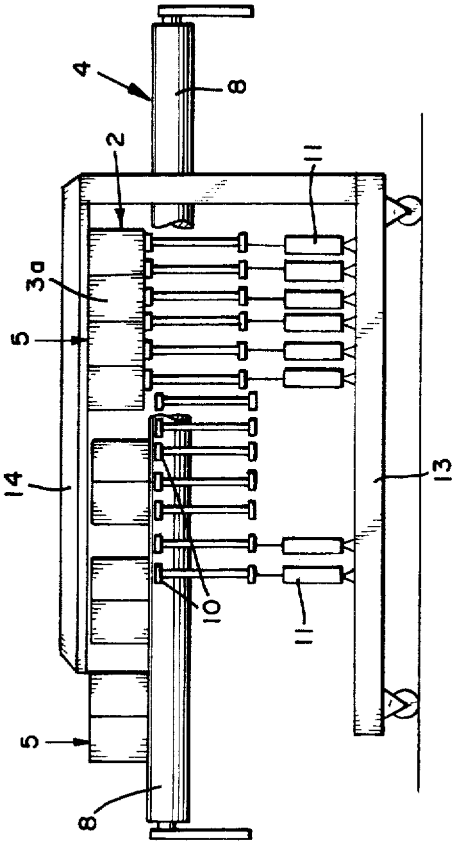
FIG. 4 is a view similar to the view of FIG. 3, however the spacing of larger formed articles is shown.

The length of the individual sections 10 of the carrying strips 9 is adapted to the width of the smallest formed article such that always only one section 10 supports a formed article 3 in its width. When wider formed articles 3*a* are handled then several sections 10 support each article 3*a*. The lift cylinders 11 are then actuated depending on the number of sections 10 supporting the formed article 3*a*. The horizontal restraining bars 14 above the sections 10 prevent the tipping over of the formed articles 3*a*, when only one section 10 supports the formed article 3*a* (FIG. 4). The formed articles can be all kinds of bricks and blocks or other items of manufacture.

As various possible embodiments might be made of the above invention, and as various changes might be made in the embodiment above set forth, it is to be understood that all matter herein described or shown in the accompanying drawings is to be interpreted as illustrative and not in a limiting sense.

What is claimed is:

1. An apparatus for setting formed articles comprising
   - means for providing the formed articles;
   - a series of horizontally spaced rollers for receiving the formed articles from the means for providing the formed articles with the axes of the spaced rollers being substantially normal to the direction of motion of the articles being received;
   - a carriage movable in a direction substantially parallel to the axis of the spaced rollers;
   - at least two actuators mounted on the carriage and independently operable;
   - at least two support strips each extending in a direction substantially parallel to the roller axes and subdivided into sections connected to the actuators said sections being capable of moving up and down independently from each other between the rollers; and means for receiving the formed articles.

2. The apparatus as set forth in claim 1 wherein the means for providing the formed articles is a conveyor belt.

3. The apparatus as set forth in claim 1 wherein the means for receiving the formed articles is a gripper.

4. The apparatus as set forth in claim 1 wherein the means for receiving the formed articles is a conveyor belt.

5. The apparatus as set forth in claim 1 wherein the sections of the strips carrying the formed articles are connected by linkages.

6. The apparatus as set forth in claim 5 wherein the lift cylinders are actuating the linkages.

7. The apparatus as set forth in claim 1 wherein each strip is supported by at least two actuators.

8. The apparatus as set forth in claim 1 further comprising a substantially horizontal restraining bar located above the rollers for restraining the formed articles from tipping over.

9. A method for setting formed articles comprising
   moving the formed articles on top of a series of parallel rollers;
   moving through the spaces between the rollers with support sections forming at least one strip parallel to the axes of the rollers;
   lifting at least some formed articles from the rollers with some separately controlled support sections; moving the formed articles and support sections, which have been lifted up, in a direction parallel to the axes of the rollers;
   lowering a part of the formed articles independently from any lifting motion of the other formed articles in the row with separately controlled support sections, which had been lifted up, for allowing the formed articles to be placed down; and
   removing the formed articles.

10. The method as set forth in claim 9 further comprising restraining the formed articles from the top from tipping.

11. The method as set forth in claim 9 wherein the formed articles are removed by gripping from above.

12. The method as set forth in claim 9 wherein the formed articles are placed down on the rollers.

13. The method as set forth in claim 9 wherein the formed articles are removed by lifting them up from below and carrying them away from the parallel rollers.

* * * * *